Feb. 17, 1931.     A. R. BETHEL     1,792,727
METHOD OF AND MEANS FOR FEEDING GLASS
Filed Sept. 22, 1927    2 Sheets-Sheet 2

Inventor,
Albert R. Bethel,
By C. C. Hines,
Attorney.

Patented Feb. 17, 1931

1,792,727

UNITED STATES PATENT OFFICE

ALBERT R. BETHEL, OF HUNTINGTON PARK, CALIFORNIA

METHOD OF AND MEANS FOR FEEDING GLASS

Application filed September 22, 1927. Serial No. 221,306.

This invention relates to a method of and means for feeding glass, and particularly to glass feeders of a type for discharging charges of glass in stream, drop or gob form from a discharge spout or trough for supply to molds in the manufacture of glass articles. More particularly the invention relates to improvements in the discharge spout itself, and to a method of heating the glass therein, whereby the efficiency of the feeder is greatly increased.

In feeders of the class to which my invention relates the molten glass is conducted from a melting furnace to the discharge spout, in which a body of glass constantly lies, from which body of glass portions of the glass are segregated and discharged at certain intervals through a discharge orifice, the discharge of the glass being controlled by a valve, feed plunger or other suitable control device. It is practically impossible, with constructions previously used, at least for any given material period of time, to keep the body of glass in the spout at a desired uniform temperature and consistency to give the best results. As a result imperfect charges are frequently supplied to the molds, causing the production of faulty articles. Attempts have heretofore been made to overcome the difficulty by the provision of means for specially heating the body of glass in the spout in various ways, but so far as I am aware, none of these has entirely, for one reason or another, proved a practical success.

The main object of my invention is to provide a method of heating the glass in the spout and controlling the applied heat in such manner as to maintain the glass with a substantial degree of constancy at a desired uniform and requisite temperature and consistency at all working periods, so that charges for the formation of articles free or practically free from flaws may be produced with a high degree of regularity.

A further object of the invention is to provide a novel construction of a spout and heat controlling means for this purpose.

The invention consists of the novel method of heating, and of the features of construction, combination and arrangement of parts in a feed device of the character described, hereinafter fully described and claimed, reference being had to the accompanying drawings, in which:—

Figure 3 is a vertical transverse section on line 3—3 of Figure 1.

Figure 1:
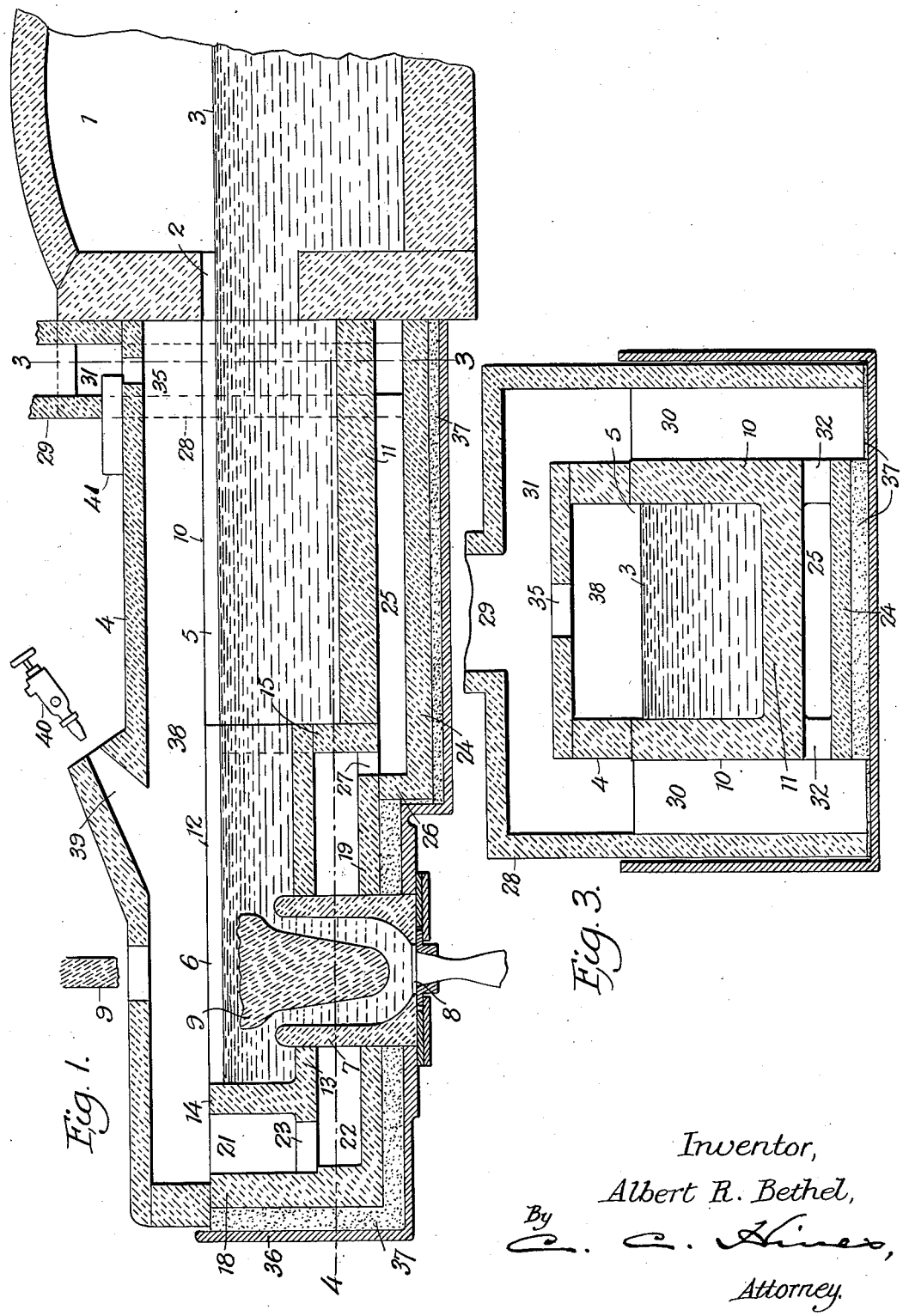
Figure 1 is a vertical longitudinal section through a discharge spout disclosing an exemplification of the invention.
Figure 2:
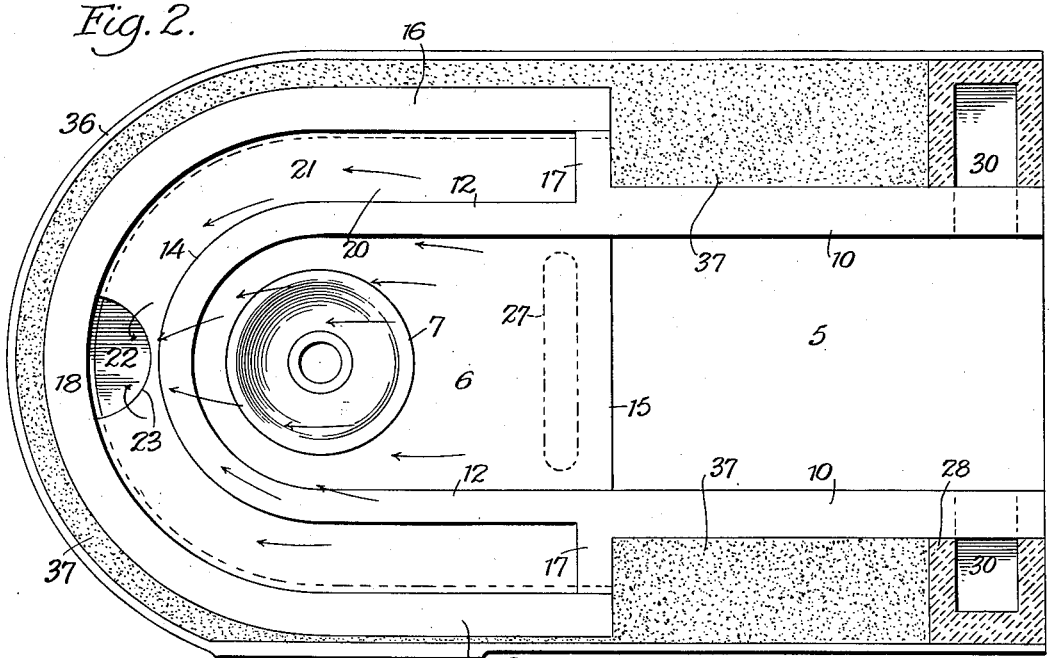
Figure 2 is a top plan view of the spout with the top portion omitted.
Figure 4:
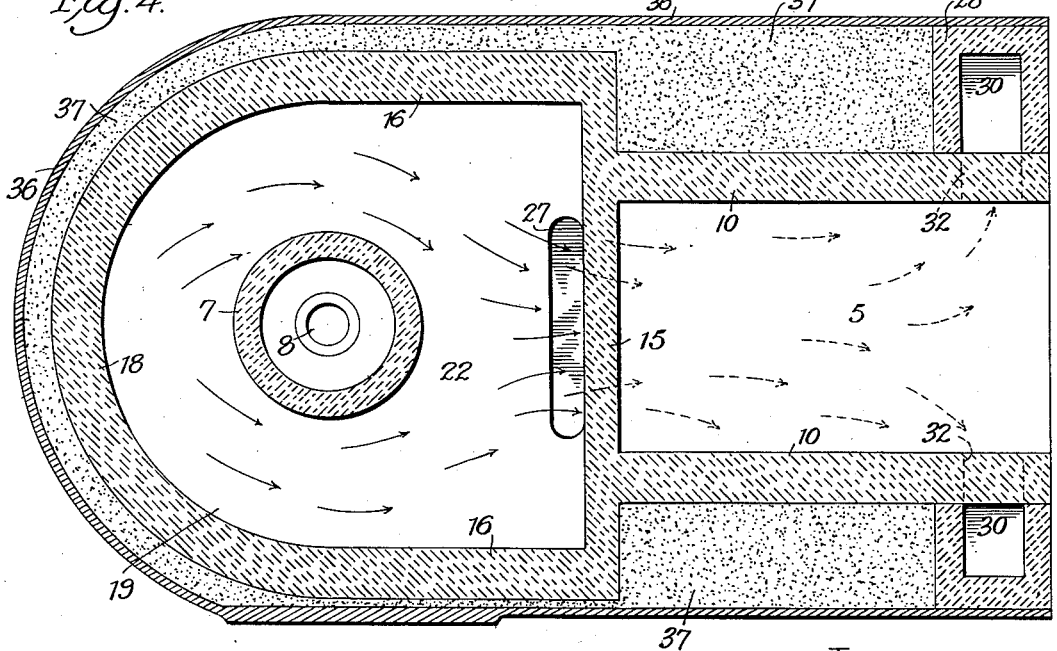
Figure 4 is a horizontal section on line 4—4 of Figure 1.

Referring now more particularly to the drawings, 1 designates a melting furnace having an outlet 2 for the flow of the molten glass 3 therefrom into the discharge spout or trough 4. This spout is provided with an inner storage chamber 5 and an outer feed chamber 6, with which latter communicates a cup-shaped stationary valve member or bushing 7 forming a discharge chamber. The member 7 is formed in its bottom with an orifice 8 through which the portion of glass to form the charge or gob is expressed and suitably severed from the remainder of glass therein for supply to the mold. A suitably operated vertically movable (reciprocable) discharge valve member, plunger or other discharge device 9 is provided for periodically governing the flow of glass from the chamber 6 to the chamber 7 and from the latter through the orifice 8. The elements 7 and 9 may be similar in structure and operation with the corresponding elements shown in my copending application Serial No. 143,203, or they may be otherwise constructed and operated.

The chamber 5 comprises side walls 10 and a bottom wall 11, while the chamber 6 comprises side walls 12, a bottom wall 13 and an outer end wall 14. The wall 13, as shown, is arranged at a higher level than the wall 11, and a vertically disposed, transverse bridge or dam wall 15 closes the space between said walls at the outer end of chamber 5. By this construction the chamber 5 is made of greater depth and glass containing capacity than the chamber 6, so that the high level glass passing into chamber 6 from the upper portion of chamber 5 above the dam formed by the wall 15 will be retarded in its flow by the resistance of the low level glass in chamber 5 below the plane of the dam. An even and regular flow of the glass from chamber 5 to chamber 6 will thus be obtained and irregularities of flow prevented in a simple and effective manner. At the same time this regulated and retarded flow of the glass allows sufficient time to elapse for the thorough commingling of glass of different temperatures, heated in the manner hereinafter described, so that at all times glass of the same degrees of temperature and consistency will be furnished for passage into the discharge chamber 7 and discharge through the outlet 8.

The wall 14 is preferably but not necessarily curved on the arc of a circle, and extending outside of and parallel with the walls 12 are walls 16 joined at their rear ends by short transverse walls 17 to the walls 10 and 12 and at their forward ends by a curved wall 18 concentric with wall 14. The walls 16, 17 and 18 extend from a level below the wall 13 up to the common level of the walls 10 and 12 and are joined at their lower edges to a bottom wall 19, which is spaced from the wall 13. The walls 16, 17, 18 and 19 thus form a heating jacket or chamber which surrounds the sides and bottom of the chamber 6. This chamber is divided by a partition 20 into an upper heating channel or flue 21 surrounding the sides and outer end of chamber 6, and a horizontal flue 22 extending longitudinally beneath the chamber 6 and the channel 21. Between the walls 14 and 19 the partition 20 is provided with a downdraft opening 23 connecting the forward cross portion of channel 21 with the forward portion of the flue 22.

Disposed below the bottom wall 11 of the storage chamber 5 is a horizontal wall 24 spaced from the walls 11 to provide a flue or heating chamber 25. The wall 24 evxtends forwardly to a point beyond the vertical plane of the dam wall 15 and is joined to the wall 19 by a short upright wall 26, and the wall 19 at this point is provided with a downdraft opening 27 connecting the rear end of the flue 22 with the forward end of the flue 25. Surrounding the sides and top of chamber 5 adjacent to the walls of the furnace provided with the passage 2 is a third heating chamber or draft chamber 28 provided at its top with a chimney 29. This chamber 28 forms a pair of updraft flues 30 located on opposite sides of the chamber and connected by a cross passage 31 with the chimney 29. Transverse passages 32 formed in the walls 10 below the level of wall 11 connect the flue 25 with the lower ends of the flues 30. A cover 33 closes the tops of the chambers 5 and 6 and the channel 21, and this cover is provided with an opening 34 for the upward passage of the stem of the valve 9, and with an outlet opening 35 connecting the rear end of chamber 5 at its top with the chimney 29. A casing 36, preferably of metal, encloses the body of the spout constructed as above described, and a layer 37 of a suitable heat-insulating material is provided between the spout body and the casing to prevent loss of heat. As shown, the top wall of the cover 4 lies above the level of the chambers 5 and 6 and channel 21 so as to form a horizontally and longitudinally extending overhead flue or heating chamber 38 with which the chambers 5 and 6 and channel 21 are in direct communication and which flue 38 connects at its rear end through the outlet 35 with the chimney 29. A port 39 is provided in the top wall of the cover 4 which is arranged above the chamber 6 at an oblique downward and forward angle so as to direct a heating blast from a burner 40 against the plunger or valve 9 and the surface of the glass in the chamber 6, whereby a heating medium is supplied and a temperature controlling action obtained for maintaining the glass at all times at a desired uniform temperature and consistency. A valve or damper 41 controls the discharge of the products of combustion from the flues 20 to and through the stack 29.

In the operation of the apparatus whereby a novel and highly efficient glass feed and temperature controlled action is obtained, glass heated to a predetermined degree in the furnace is supplied to the storage chamber 5 and thence flows to the feed chamber 6 and from thence, under the control of the feed plunger of valve 9, into the discharge chamber or cup 7, from which desired quantities are expressed through the outlet 8. The chamber 5, by reason of its greater depth, contains a greater volume of glass than the chamber 6, and the portion of the glass in the bottom of the chamber 5 and below the level of the wall 13 is of slightly less temperature and viscosity than the remainder of the glass in the chamber 5 above the level of the wall 13. This bottom portion of glass of slightly less temperature and viscosity is prevented by the dam wall 15 from flowing into the chamber 6, but opposes, by tendency to cohesion, a resistance to the flow of glass of higher level from the chamber 5 to the chamber 6, by which an even and regulated flow of the glass from the storage chamber 5 to the feed chamber 6 is ensured. This is of great value and importance in enabling the glass contained in the chamber 6 and supplied thereto from the chamber 5 to be temperature controlled to a high degree of efficiency in order that glass of any predetermined degree of temperature and viscosity may be uniformly supplied to the discharge chamber 13. The glass contained in the chamber 6, being of less quantity and more remote from the furnace than the glass in the chamber 5, is liable to greater temperature and viscosity changes, as a result of which variations are apt to occur. Accordingly, this glass in the chamber 6 and the feed controller 9 movable therein are subjected to the direct heat of the flames furnished by the burner 40, and directed against the surface of the glass and the controller by the obliquely arranged port 39. Thus this portion of the glass is kept heated to the exact temperature desired and, because of the relatively small quantity of glass contained in this chamber at a time, a substantially uniform heating of the glass is absolutely ensured, with the result that glass of any predetermined temperature and viscosity may be supplied and discharged through the outlet 8. By the provision of the flue 38 overlying both chambers 5 and 6, this flue is kept intensely heated so as to effectively avoid any cooling of the portions of glass at the surface below a predetermined temperature. The heating medium, after exerting a direct heating effect upon the glass in the chamber 6, flows over the walls 12 and 14 into the channel 21, and thence through the passage 23 into the heating chamber 22, thus keeping all walls of the chamber 6, the wall 19 and the discharge chamber 7 and its contents, exposed in said flue or chamber, heated so as to prevent any change in the temperature or viscosity of the glass being dispensed. From the flue or chamber 22 the heating medium then passes through the downdraft passage 27 into the flue or heating chamber 25 and thence through the passages 32 into the flues 30 and passage 31 and thence outward through the passage 31 into the chimney 29 for discharge to the atmosphere, thereby keeping the walls of the chamber 5 heated to maintain the glass therein at the predetermined temperature and viscosity. Thus it will be seen that the heating medium is first directed against the feed controller and surface of the glass in the chamber 6, then directed downwardly around the bottom and sides of the chamber 6 to keep all walls thereof and the discharge chamber 7 at a uniform temperature, thence directed downwardly beneath the bottom of the chamber 5 and thence upwardly through the chamber 28 to keep all walls of the chamber 5 at a uniform temperature, the heating medium thence being discharged through the stack 29, which is of suitable dimensions to secure the desired amount of draft for the flow of the heating medium. The valve or damper 41 is adjustable to control the passage 35 to prevent any undue back draft or suction, causing interference with the flow of the heating medium and liable to cause irregular flow of glass, by the adjustment of which valve the rate of speed of flow of which heating medium may be effectually governed or controlled. It will be noted that the passage 25 and stack 29 are located at the rear of the spout and close to the front of the furnace, where, because of the intensity of the heat, any portion of air drawn into the flue 38 through the passage 39 will be commingled with the heating medium and its temperature raised to such a degree that it will not lower the temperature in the flue 38 or chill the glass contained in the chamber 5, so that atmospheric pressure variations may be compensated for and the flow of the heating medium governed without causing irregularities of glass flow or variations of temperature liable to lower the temperature of the glass below the exact degree desired. It will, therefore, be seen that a combined flow and temperature regulation is obtained which ensures at all times the supply of glass of just the right temperature and viscosity for use, and that the entire amount of glass contained in the spout is under absolute temperature control from the time it enters until it is discharged, and that the glass is also protected against temperature changes. By thus absolutely controlling the rate of flow, the temperature and the viscosity of the glass, glass of an exact degree of temperature and consistency may be constantly supplied for use, so that articles free from flaws may be produced with a high degree of regularity.

Having thus fully described my invention, I claim:—

1. The method of controlling the temperature of molten glass in a discharge chamber, which consists in flowing glass from a storage chamber into a feed chamber at one side of the latter, directing a temperature modifying medium upon the surface of the glass at the opposite side of said feed chamber, causing said medium to flow downwardly in contact with the latter-named side and the remaining sides of the feed chamber, and thence beneath the bottom of said chamber and the bottom of the storage chamber, and then conducting the medium upwardly along the sides of the storage chamber and discharging it to the atmosphere.

2. The method of controlling the temperature of molten glass in a discharge chamber, which consists in flowing glass from a storage chamber into a feed chamber of greater length than width at one end of said chamber, directing a temperature modifying medium upon the surface of the glass at the opposite end of the feed chamber, causing said medium to flow downwardly in contact with the latter-named end and the sides of the feed chamber and thence beneath the bottom of said feed chamber toward the first-named end of the feed chamber and beneath the storage chamber through a course insulated from the atmosphere, and then conducting the medium upwardly along the sides of the storage chamber and discharging it above said chamber to the atmosphere.

3. The method of controlling the temperature of molten glass in a feed chamber having an outlet at one end and an inlet at its opposite end, which consists in feeding glass to the inlet end of the feed chamber from a storage chamber projecting a temperature modifying medium against the surface of the glass in the feed chamber adjacent the outlet end thereof, conducting the medium over the outlet end and downwardly about said end and the sides of the feed chamber and beneath the bottom of said chamber in the region of the outlet and thence along the bottom of the feed chamber to its inlet end and beneath the storage chamber, and finally conducting the medium upwardly along the sides of the storage chamber and discharging it to the atmosphere.

4. The method of controlling the temperature of molten glass in a spout having a storage chamber at its inner end communicating with a furnace and a feed chamber at its outer end provided with a discharge outlet, which consists in projecting a heat modifying flame upon the surface of the glass in the feed chamber, then conducting the heat downwardly about the front and sides of said feed chamber and beneath the bottom surfaces of both chambers, and then conducting the heat upwardly along the sides of the storage chamber and exhausting the same to the atmosphere.

5. The method of controlling the temperature of molten glass in a spout having a storage chamber at its inner end communicating with a furnace and a feed chamber at its outer end provided with a discharge outlet, which consists in flowing the glass from the storage chamber to the feed chamber at the inner end thereof while opposing the resistance of an underlying body of glass in the storage chamber to retard its flow, projecting a heating medium downwardly upon the surface of the glass in the feed chamber, conducting said medium downwardly about the outer end and the sides of the discharge chamber and beneath the same, then conducting the heat rearwardly beneath the storage chamber, and finally conducting the heat upwardly about the sides of the storage chamber and exhausting it to the atmosphere.

6. A spout for delivering viscous glass from a furnace having a storage chamber at its inner end communicating with the furnace and a food chamber at its outer end provided with a discharge outlet, said storage chamber being of greater depth than the feed chamber and extending therebelow, a dam interposed between the bottom walls of said chambers at the juncture of the outer end of the storage chamber with the inner end of the feed chamber to cause a portion of the glass in the storage chamber below the level of the dam to oppose a resistance to the flow of glass from the storage chamber to the feed chamber, and means for projecting a heating medium against the surface of the glass in the feed chamber and conducting said medium downwardly and rearwardly in contact with the outer end and sides of the feed chamber, thence along the bottom surfaces of said chambers and the dam wall and thence upwardly along the sides of the storage chamber.

7. A spout for supplying viscous glass from a furnace having a storage chamber at its inner end communicating with the furnace and a feed chamber at its outer end, a discharge chamber communicating with and extending downwardly through the bottom of the feed chamber, a heating chamber in communication with the top of the spout and partially surrounding the feed chamber and extending beneath the feed and storage chambers and about the downwardly projecting portion of the discharge chamber, means for projecting a heating agent against the surface of the glass in the feed chamber for travel therefrom downwardly into the heating chamber, and an exhaust chamber communicating with the heating chamber adjacent the furnace and having an outlet to the atmosphere.

8. A spout for supplying viscous glass from a furnace having a storage chamber at its inner end communicating with the furnace and a feed chamber at its outer end, a discharge chamber communicating with the feed chamber and extending downwardly through the bottom wall thereof, a heating chamber partly surrounding the feed chamber and communicating with the top of the spout above said chamber and extending along the undersides of the feed and storage chambers, means for projecting a heating medium against the surface of the glass in the feed chamber, the said spout being provided with a ventilation opening in its top lying above the storage chamber, a draft chamber communicating with the heating chamber and extending about the storage chamber adjacent to the furnace, a stack communicating with the upper end of the draft chamber, and a valve controlling the ventilation opening.

In testimony whereof I affix my signature.

ALBERT R. BETHEL.